Patented June 27, 1950

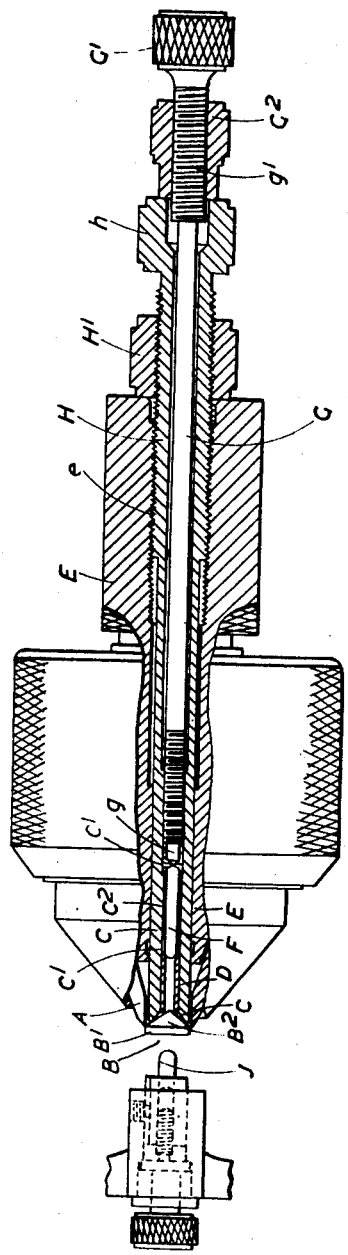

2,513,138

UNITED STATES PATENT OFFICE 2,513,138

DEPTH PEG FOR MECHANICAL GRIPPERS

Thomas P. N. Burness and Alfred Johnson, Halifax, England

Application July 30, 1947, Serial No. 764,857
In Great Britain October 7, 1942

Section 1, Public Law 690, August 8, 1946
Patent expires October 7, 1962

4 Claims. (Cl. 51—229)

This invention relates to a depth peg that is adjustably mounted in a mechanical gripper for setting the position of a diamond or other substance hereinafter referred to as diamond in the gripper so that the latter can grip the girdle portion of the diamond and securely hold same during the grinding of the facets on the table end, the said girdle having been previously made truly circular and truly cylindrical or approaching these conditions.

As is well known the collette angles on different diamonds vary within certain limits and the present invention has for its object to introduce a universal depth peg which can be adjusted to suit the different collet angles.

The accompanying drawing is a sectional elevation of a mechanical gripper fitted with a universal depth peg constructed in accordance with this invention.

A indicates the gripper jaws, B the diamond, $B^1$ the girdle portion. C the depth peg. D the core and E a tubular holder which forms a part of the gripper.

The depth peg C comprises a tube that makes a sliding fit in the forward end of the tubular holder E and has its front end countersunk as shown at $c$ so that it supports the collet $B^2$ of the diamond in proximity to the girdle $B^1$. Slidably mounted in the front end of the tube is the endwise displaceable core D which is shewn made in the form of a short tube that supports the collet $B^2$ of the diamond in proximity to the apex. Mounted in a clearance hole $c^2$ in the tube C is a short rod F that occupies a position between the inner end of the core D and a reduced portion $g$ of a screw G that screws into a tapped hole $c^1$ of the tube C. The latter is threaded at H to screw into a tapped hole $e$ in the tubular holder E and terminates in a knurled head $h$ by which it can be turned in one direction or the other for adjusting the countersunk end $c$ to set the diamond B to the correct depth in the gripper jaws A. $H^1$ indicates a lock nut for fixing the screw H after adjustment. The outer end of the spindle G terminates in a knurled head $G^1$ and is threaded at $g^1$ to engage a nut $G^2$.

The diamond is first set to the correct depth in the gripper jaws by adjusting the tubular portion C by the adjusting screw H. An external holding appliance J (not shown) can then be actuated to make contact with the table of the diamond and the core D adjusted by turning the knurled head $G^1$ until the end of the core contacts with the collet $B^2$ in which position the screw G is fixed by tightening the lock nut $G^2$ against the knurled head $h$. In an alternative construction the rod F may be dispensed with and the reduced end $g$ of the spindle G may be extended to take its place.

What we claim as our invention and desire to secure by Letters Patent of the United States is:

1. In a depth peg for adjusting and setting the position of a diamond or the like in a mechanical gripper having a plurality of adjustable jaws for gripping the diamond about a preformed girdle thereon, the combination of a holder; a tube longitudinally movable in said holder and having a forward portion provided with a smaller diameter than that of the girdle on said diamond and extending forwardly within said jaws out of contact therewith in effective position to abut or axially support a preformed collet on said diamond disposed concentrically to the girdle thereon; a core of sufficiently small diameter to be longitudinally slidable within said tube disposed within the forward end of the latter and having a hollow forward end for abutting the vicinity of the apex portion of the collet on said diamond; means for abutting the opposite or rear end of said core and thereby bringing the forward end thereof against said diamond; means for fixing said tube in selected position with respect to said holder; and means cooperating with said tube effective to maintain said core in set position within said tube.

2. In a depth peg for adjusting and setting the position of a diamond or the like in a mechanical gripper having a plurality of adjustable jaws for gripping the diamond about a preformed girdle thereon, the combination of a holder; a tube longitudinally movable in said holder and having a forward portion provided with a smaller diameter than that of the girdle on said diamond and extending forwardly within said jaws out of contact therewith in effective position to abut or axially support a preformed collet on said diamond disposed concentrically to the girdle thereon; the holder having a hole extending therethrough with a tapped portion therein; a corresponding thread on a portion of the tube engaging with the tapped portion of said hole; a lock nut mounted on a portion of the thread on said tube exteriorly of said holder and adapted to bear against an end thereof to lock said tube in selected position with respect to said holder; a core of sufficiently small diameter to be longitudinally slidable within said tube disposed within the forward end of the latter and having a hollow forward end for abutting the vicinity of the apex portion of the collet on said diamond; means for abutting the opposite or rear end of said core and thereby bringing the forward end thereof against said diamond; and means cooperating with said tube effective to maintain said core in set position within said tube.

3. In a depth peg for adjusting and setting the position of a diamond or the like in a mechanical gripper having a plurality of adjustable jaws for gripping the diamond about a preformed girdle thereon, the combination of a holder; a tube longitudinally movable in said holder and having a forward portion provided with a smaller diameter than that of the girdle on said diamond and extending forwardly within said jaws out of contact therewith in effective position to abut or axially support a preformed collet on said diamond disposed concentrically to the girdle thereon; a core of sufficiently small diameter to be longitudinally slidable within said tube disposed within the forward end of the latter and having a hollow forward end for abutting the vicinity of the apex portion of the collet on said diamond, the tube having a tapped portion within the hole thereof; an elongated screw of sufficiently small diameter to extend through said tube and having a thread on a portion thereof engaging with the tapped portion of the hole in said tube; means disposed at one end of said elongated screw in effective position to abut the opposite or rear end of said core and thereby bring the forward end thereof against said diamond; means for fixing said tube in selected position with respect to said holder; and means for fixing said elongated screw in attained position with respect to said tube and thereby maintaining said core in said position wholly within said tube.

4. In a depth peg for adjusting and setting the position of a diamond or the like in a mechanical gripper having a plurality of adjustable jaws for gripping the diamond about a preformed girdle thereon, the combination of a holder; a tube longitudinally movable in said holder and having a forward portion provided with a smaller diameter than that of the girdle on said diamond and extending forwardly within said jaws out of contact therewith in effective position to abut or axially support a preformed collet on said diamond disposed concentrically to the girdle thereon, the holder having a hole extending therethrough with a tapped portion therein; a corresponding thread on a portion of the tube engaging with the tapped portion of said hole; a lock nut mounted on a portion of the thread on said tube exteriorly of said holder and adapted to bear against an end thereof to lock said tube in selected position with respect to said holder; a core of sufficiently small diameter to be longitudinally slidable within said tube disposed within the forward end of the latter and having a hollow forward end for abutting the vicinity of the apex portion of the collet on said diamond, the tube having a tapped portion within the hole thereof; an elongated screw of sufficiently small diameter to extend through said tube and having a thread on a portion thereof engaging with the tapped portion of the hole in said tube; means disposed at one end of said elongated screw in effective position to abut the opposite or rear end of said core and thereby bring the forward end thereof against said diamond; a second thread upon said elongated screw spaced a predetermined distance from the first mentioned thread thereon and extending beyond the rear end of said tube; and a second lock nut mounted upon the second thread on said elongated screw adapted to engage against the rear end of said tube to lock said elongated screw in attained position with respect to said tube and thereby maintain said core in said position wholly within said tube.

T. P. N. BURNESS.
ALFRED JOHNSON.

REFERENCES CITED

The following references are of record in the file of this patent:

UNITED STATES PATENTS

| Number | Name | Date |
|---|---|---|
| 2,393,939 | Spira | Jan. 29, 1946 |
| 2,394,242 | Jearum | Feb. 5, 1946 |
| 2,429,961 | Rakowitzky | Oct. 28, 1947 |